US010793062B2

(12) United States Patent
Kim (10) Patent No.: US 10,793,062 B2
(45) Date of Patent: Oct. 6, 2020

(54) LIGHTING DEVICE FOR AUTOMOBILE AIR VENT

(71) Applicant: NIFCO KOREA INC., Asan-si, Chungcheongnam-do (KR)

(72) Inventor: Geun Heung Kim, Chungcheongnam-do (KR)

(73) Assignee: NIFCO KOREA INC., Chungcheongnam-Do (KR)

( * ) Notice: Subject to any disclaimer, the term of this patent is extended or adjusted under 35 U.S.C. 154(b) by 0 days.

(21) Appl. No.: 16/711,596

(22) Filed: Dec. 12, 2019

(65) Prior Publication Data
US 2020/0207263 A1    Jul. 2, 2020

(30) Foreign Application Priority Data
Dec. 26, 2018  (KR) .......................... 10-2018-0169513

(51) Int. Cl.
*B60Q 3/18*   (2017.01)
*B60H 1/34*   (2006.01)
*B60Q 3/62*   (2017.01)

(52) U.S. Cl.
CPC ............. *B60Q 3/18* (2017.02); *B60H 1/3421* (2013.01); *B60Q 3/62* (2017.02); *B60K 2370/349* (2019.05)

(58) Field of Classification Search
CPC ........ B60Q 3/18; B60Q 3/62; H05B 37/3421; F21V 2200/13; F21V 2200/15; F21V 2200/20; F21V 2200/40; F21V 5/04
See application file for complete search history.

(56) References Cited

U.S. PATENT DOCUMENTS

| | | | | |
|---|---|---|---|---|
| 4,916,591 A | * | 4/1990 | Schiele ................ | B60H 1/3414 362/23.15 |
| 2005/0045802 A1 | * | 3/2005 | Niemann ............. | H05K 1/0284 250/203.1 |
| 2009/0298406 A1 | * | 12/2009 | Norbury, Jr. ............. | B60Q 3/20 454/69 |
| 2010/0163549 A1 | * | 7/2010 | Gagas .................. | H05B 6/1209 219/622 |

(Continued)

FOREIGN PATENT DOCUMENTS

| KR | 10-1421929 B1 | 7/2014 | | |
|---|---|---|---|---|
| KR | 20150014233 A | * | 2/2015 | ........... B60H 1/3421 |

(Continued)

*Primary Examiner* — Amy Cohen Johnson
*Assistant Examiner* — Syed M Kaiser
(74) *Attorney, Agent, or Firm* — Thomas Horstemeyer, LLP (57) ABSTRACT

Provided is a lighting device for an automobile air vent. The lighting device for an automobile air vent has a variable resistor, a light emitter, a light guide, and a diffusion plate. The variable resistor is connected to a knob of an air vent and is configured to vary resistance according to a manipulation amount of the knob. The light emitter is connected to the variable resistor and is configured to emit light such that brightness or color of the light is varied according to the variable resistance varied by the variable resistor. The light guide is configured to guide the light emitted by the light emitter. The diffusion plate is installed in an air vent housing of the air vent and is configured to diffuse the light guided through the light guide.

5 Claims, 6 Drawing Sheets

(56) References Cited

U.S. PATENT DOCUMENTS

| | | | | |
|---|---|---|---|---|
| 2012/0063116 A1* | 3/2012 | Baxter | ................... | G03B 15/05 |
| | | | | 362/6 |
| 2012/0180998 A1* | 7/2012 | Nishioka | ............ | B01D 53/8678 |
| | | | | 165/104.34 |
| 2013/0215637 A1* | 8/2013 | An | .......................... | B60Q 3/20 |
| | | | | 362/580 |
| 2015/0009452 A1* | 1/2015 | Lee | ................... | G02F 1/133603 |
| | | | | 349/64 |
| 2015/0062890 A1* | 3/2015 | Camarota | ............. | F21V 15/012 |
| | | | | 362/223 |
| 2016/0185286 A1* | 6/2016 | Cazenave | ........... | F21V 33/0092 |
| | | | | 362/511 |
| 2016/0312978 A1* | 10/2016 | Park | ....................... | F21V 29/70 |
| 2017/0090115 A1* | 3/2017 | Jurik | ....................... | G02B 6/00 |
| 2017/0278647 A1* | 9/2017 | Dimberg | .................. | H01H 9/02 |
| 2017/0305239 A1* | 10/2017 | Yoda | ........................ | B60H 1/34 |
| 2017/0354021 A1* | 12/2017 | Dimberg | ................ | G05B 15/02 |
| 2018/0098407 A1* | 4/2018 | Kazanchian | ......... | H05B 47/105 |
| 2018/0343403 A1* | 11/2018 | Mehdi | ................ | H04N 5/23245 |
| 2020/0187321 A1* | 6/2020 | Kansal | ................... | F21V 17/10 |

FOREIGN PATENT DOCUMENTS

| | | |
|---|---|---|
| KR | 10-1828717 B1 | 2/2018 |
| WO | 2018/106081 A1 | 6/2018 |

* cited by examiner

LIGHTING DEVICE FOR AUTOMOBILE AIR VENT

CROSS-REFERENCE TO RELATED APPLICATION

This application is based upon and claims the benefit of priority from Korean Patent Application No. 10-2018-0169513, filed on Dec. 26, 2018, the entire contents of which are incorporated herein by reference.

TECHNICAL FIELD

The present disclosure relates to a lighting device for an automobile air vent.

BACKGROUND

An automobile is equipped with an air conditioner that allows an occupant in the automobile to adjust the temperature of the automobile interior. Cold air or warm air generated by the air conditioner is supplied to an air vent through a duct. The air vent is mounted on an instrument panel or a console that is installed in the automobile interior, and the cold or warm air is supplied to the automobile interior through the air vent.

The air vent may have a damper that adjusts the open/close degree of a duct, a knob that adjusts the movement of the damper, and a housing fixedly coupled to a front portion of the duct provided with the knob. The occupant can adjust the open/close degree of the duct and the discharged amount of air by manipulating the knob.

However, conventional air vents have a low discernibility. Accordingly, in circumstances where the automobile interior is dark with insufficient amount of light (e.g., when an automobile is operated at night), it is difficult for the occupant to discern whether an air vent is opened or closed.

To resolve the aforementioned inconvenience, an air vent having a lighting function has been used. Such a conventional air vent includes an LED for emitting light, and the light emitted from the LED is irradiated outside of the housing of the air vent. However, in such a conventional air vent, the brightness and color of the light emitted by the LED are constant. Therefore, the occupant can discern only the light emission of the air vent by the light emitted from the LED.

SUMMARY

Various embodiments of the present disclosure provide a lighting device for an automobile air vent, and an automobile air vent including a lighting device. One embodiment of the present disclosure provides a lighting device for an automobile air vent which enables an occupant in an automobile to visually discern a wind amount supplied to the automobile interior. One embodiment of the present disclosure provides a lighting device for an automobile air vent which emits light with varied brightness or varied color according to the occupant's manipulation of a part for adjusting the wind amount.

One embodiment of the present disclosure provides a lighting device for an automobile air vent. The automobile air vent according to one embodiment includes a duct, an air vent housing coupled to the duct, a damper installed within the duct and configured to adjust an open/close degree of the duct, and a knob configured to adjust an operating amount of the damper. The lighting device for an automobile air vent according to one embodiment includes a variable resistor, a light emitter, a light guide, and a diffusion plate. The variable resistor is connected to the knob and is configured to vary a resistance according to a manipulation amount of the knob. The light emitter is connected to the variable resistor and is configured to emit light such that brightness or color of the light is varied according to the variable resistance varied by the variable resistor. The light guide is configured to guide the light emitted by the light emitter. The diffusion plate is installed in the air vent housing and is configured to diffuse the light guided through the light guide.

In an embodiment, an input shaft of the variable resistor is connected to a central shaft of the knob and an output portion of the variable resistor is connected to the light emitter.

In an embodiment, an irradiation hole which allows the light diffused through the diffusion plate to be irradiated outwards is perforated through the air vent housing, and the diffusion plate is coupled to the irradiation hole.

According to one embodiment of the present disclosure, if an occupant in an automobile manipulates the knob in order to supply cold air or warm air generated by an air conditioner to the automobile interior, the variable resistor varies resistance according to the manipulation amount of the knob, and the light emitter may emit light such that the brightness or color of the light is varied according to the varied resistance of the variable resistor. The light from the light emitter is guided by the light guide, and, at the same time, is widely diffused through the diffusion plate, and thereafter may be irradiated outside of the air vent housing. Therefore, in circumstances where the automobile interior is dark, the occupant in the automobile can visually discern the wind amount supplied to the automobile interior from the air conditioner or the change in the wind amount.

BRIEF DESCRIPTION OF DRAWINGS

The accompanying drawings, which are incorporated in and constitute a part of the specification, illustrate embodiments of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

In the present disclosure, the description that one element is "connected," "coupled," or "fixed" to another element should be appreciated to indicate that one element may be directly connected, coupled, or fixed, to another element, and should be further understood that a new element may be interposed between one element and another element.

Figure 1:
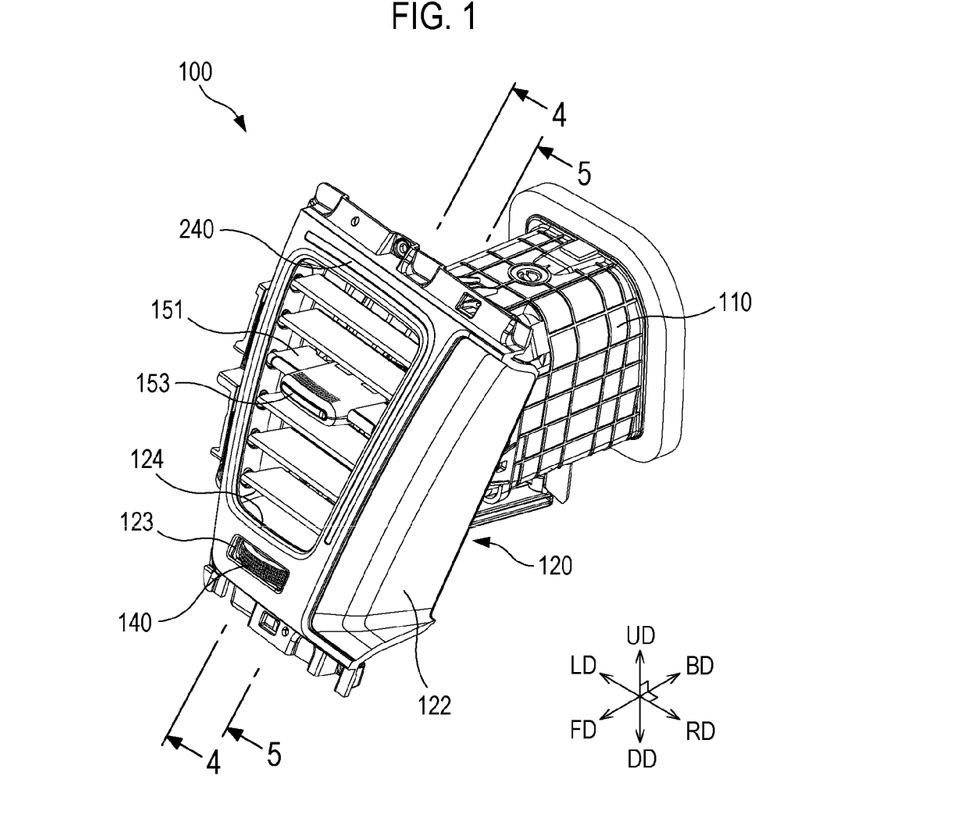
FIG. 1 is a perspective view showing an automobile air vent according to one embodiment of the present disclosure.

The terms indicating a direction such as "frontward," "rearward," "upward," "downward," "leftward," and "rightward" as used herein may correspond to the directions of the arrows indicated by reference symbols FD, BD, UD, DD, LD and RD, respectively, shown in FIG. 1. These are merely given to describe the present disclosure for clear understanding thereof, and it goes without saying that the respective directions may be defined differently depending on where the reference is placed.

Figure 2:
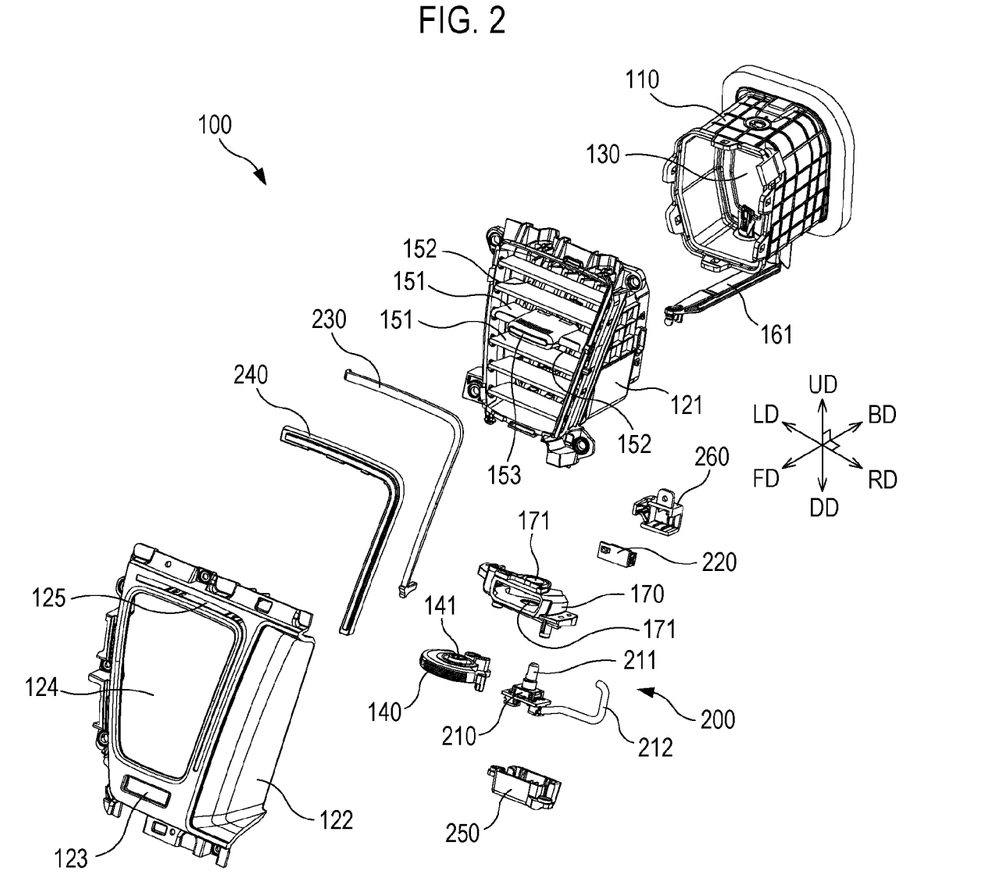
FIG. 2 is an exploded perspective view of the automobile air vent shown in FIG. 1, and shows a lighting device for an automobile air vent according to one embodiment of the present disclosure.
Figure 3:
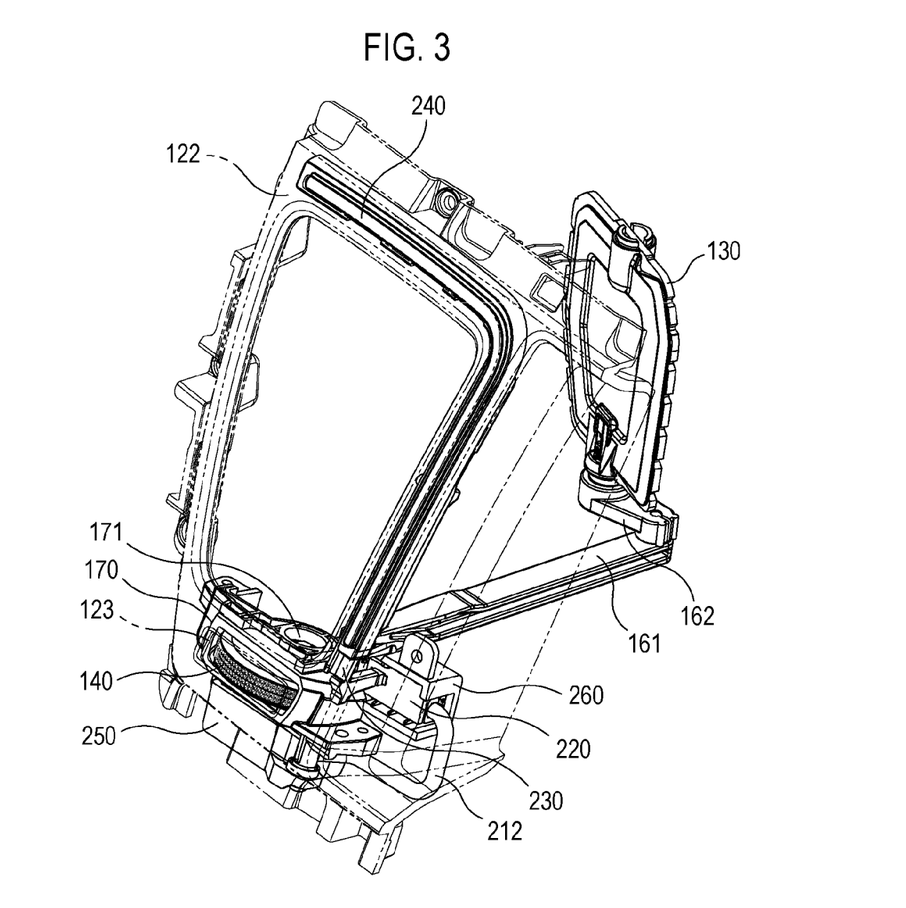
FIG. 3 is a perspective view showing an air vent housing and a lighting device for an automobile air vent according to one embodiment.
Figure 4:
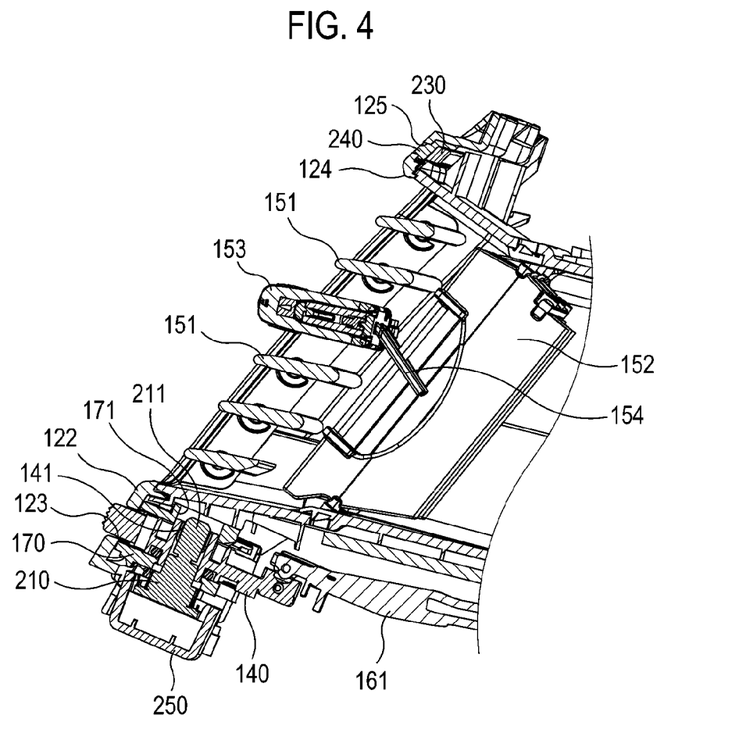
FIG. 4 is a cross-sectional view taken along a line 4-4 of FIG. 1.
Figure 5:
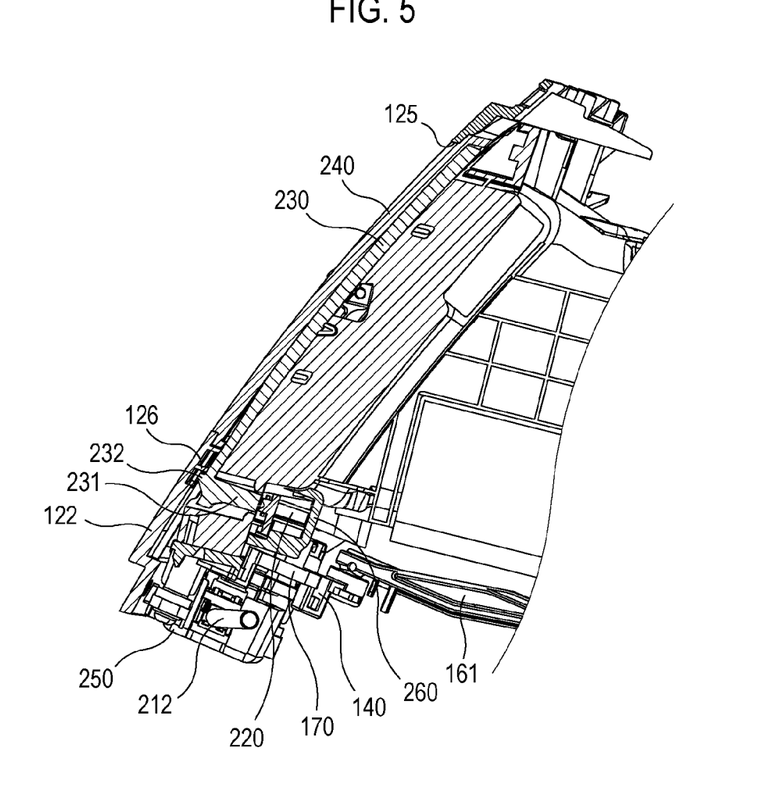
FIG. 5 is a cross-sectional view taken along a line 5-5 of FIG. 1.
Figure 6:
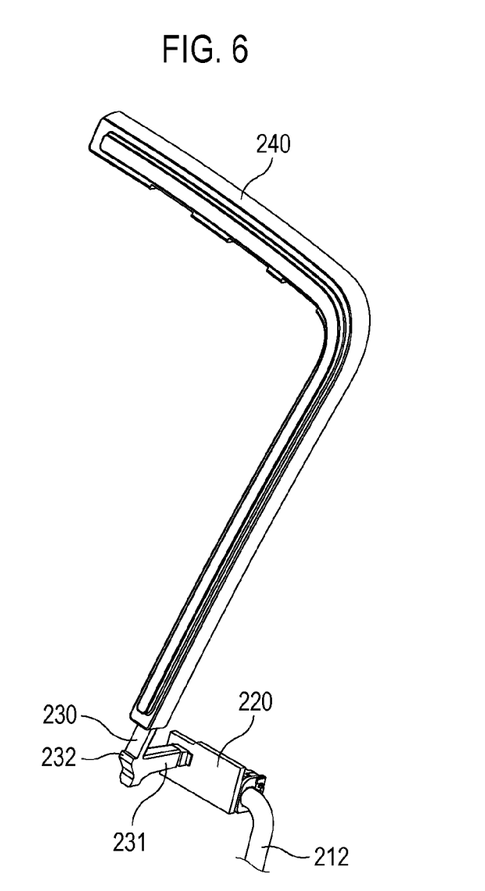
FIG. 6 is a perspective view showing a light emitter, a light guide, and a diffusion plate of a lighting device for an automobile air vent according to one embodiment.

Hereinafter, embodiments of the present disclosure will be described with reference to the accompanying drawings. Like reference numerals in the drawings denote like or corresponding elements. FIG. 1 is a perspective view showing an automobile air vent according to one embodiment of the present disclosure. FIG. 2 is an exploded perspective view of the automobile air vent shown in FIG. 1, and shows a lighting device for the automobile air vent according to one embodiment of the present disclosure. FIG. 3 is a perspective view showing an air vent housing and a lighting device for an automobile air vent according to one embodiment. FIG. 4 is a cross-sectional view taken along a line 4-4 of FIG. 1. FIG. 5 is a cross-sectional view taken along a line 5-5 of FIG. 1. FIG. 6 is a perspective view showing a light emitter, a light guide, and a diffusion plate of a lighting device for an automobile air vent according to one embodiment.

Referring to FIGS. 1 and 2, an air vent 100 according to one embodiment includes a duct 110, an air vent housing 120 coupled to the duct 110, a damper 130 installed within the duct 110, and a knob 140 installed in the air vent housing 120 and configured to adjust an operating amount of the damper 130. Cold air or warm air generated by an air conditioner of an automobile is supplied in a frontward direction FD, i.e., toward the automobile interior, through the duct 110 and the air vent housing 120. Further, the air vent 100 according to one embodiment may include vane members 151 and 152 configured to adjust a wind direction.

The air vent housing 120 is coupled to a front portion of the duct 110, and supports the knob 140 and the vane members 151 and 152. In one embodiment, the air vent housing 120 includes a rear housing 121 coupled to the duct 110, and a front housing 122 coupled to the rear housing 121 and located frontwards. The rear housing 121 and the front housing 122 may be integrally formed. The vane members 151 and 152 are installed in the rear housing 121.

The vane members 151 and 152 include a plurality of first vanes 151 for adjusting the wind direction upwards and downwards, and a plurality of second vanes 152 for adjusting the wind direction leftwards and rightwards. A vane knob 153 is movably coupled to one of the first vanes 151. As the vane knob 153 is rotated upwards and downwards, the plurality of first vanes 151 can be rotated upwards and downwards. The vane knob 153 is connected to one of the second vanes 152 through a link 154 (see FIG. 4). As the vane knob 153 is moved along the first vane 151 leftwards and rightwards, the plurality of second vanes 152 can be rotated leftwards and rightwards.

Referring to FIGS. 2 and 3, the damper 130 is rotatably installed within the duct 110. The damper 130 is configured to adjust a wind amount by adjusting the open/close degree of the duct 110. The damper 130 is operated by the knob 140. The knob 140 is connected to the damper 130 through a first link 161 and a second link 162. The knob 140 is configured to be rotatable in one lateral direction and the opposite lateral direction (e.g., leftwards and rightwards), and is installed in the air vent housing 120. As the knob 140 is rotated in one lateral direction and the opposite lateral direction, the damper 130 is rotated by the first link 161 and the second link 162. As the damper 130 is rotated, the open/close degree of the duct 110 can be adjusted and the wind amount passing through the duct 110 can be adjusted.

The air vent housing 120 has, in the front housing 122, a first opening 123 and a second opening 124. A portion of the knob 140 protrudes through the first opening 123. The first vanes 151 and the vane knob 153 are exposed through the second opening 124. Further, the air vent housing 120 has an irradiation hole 125 where light is irradiated outwards. The irradiation hole 125 is perforated through the front housing 122 of the air vent housing 120. The irradiation hole 125 may be formed along the second opening 124 in an L-like shape, but the shape of the irradiation hole 125 may be modified variously.

The air vent 100 according to one embodiment includes a lighting device 200 according to one embodiment that varies the brightness or color of the light irradiated outside of the air vent in accordance with the rotation of the knob 140. Referring to FIGS. 2 and 3, the lighting device 200 according to one embodiment includes a variable resistor 210, a light emitter 220, a light guide 230, and a diffusion plate 240.

The knob 140 is rotated in one lateral direction and the opposite lateral direction, and adjusts the operating amount of the damper 130 that adjusts the open/close degree of the duct 110. The variable resistor 210 is connected to the knob 140. The variable resistor 210 is configured to vary a resistance. If an occupant manipulates the knob 140, i.e., if the knob 140 is rotated in one lateral direction or in the opposite lateral direction, the variable resistor 210 connected to the knob 140 varies a resistance according to the manipulation amount of the knob 140.

The light emitter 220 is connected to the variable resistor 210. The light emitter 220 is configured to emit light such that the brightness of the light is varied according to the variable resistance varied by the variable resistor 210. Alternatively, the light emitter 220 is configured to emit light such that the color of the light is varied according to the variable resistance varied by the variable resistor 210. Alternatively, the light emitter 220 is configured to emit light such that the brightness and color of the light are varied according to the variable resistance varied by the variable resistor 210. In one embodiment, the light emitter 220 may include an LED. In other embodiment, the light emitter 220 may include a light emitting device capable of emitting light such that brightness, color, or brightness and color are varied. An electrical power source for supplying electrical power to the variable resistor 210 and the light emitter 220 may be provided in the air vent or supplied from the automobile.

The light guide 230 is configured to guide the light emitted by the light emitter 220. The diffusion plate 240 is configured to widely diffuse the light guided through the light guide 230. The diffusion plate 240 may be installed in the air vent housing 120. In one embodiment, the diffusion plate 240 is fixed to the irradiation hole 125 formed in the front housing 122 of the air vent housing 120. The light, which is diffused through the diffusion plate 240, is irradiated outside of the air vent housing from the diffusion plate 240 installed to the irradiation hole 125. The shapes of the light guide 230 and the diffusion plate 240 are not limited to the shapes shown in FIG. 2, and may have various shapes according to the shape of the air vent housing.

Referring to FIGS. 3 to 6, the diffusion plate 240 is inserted into the irradiation hole 125 from a rearward side of the front housing 122 toward a frontward side thereof, and is fixed to the irradiation hole 125. The light guide 230 is installed at a rear portion of the diffusion plate 240. The light emitter 220 is installed at a rear portion of the light guide 230. The light guide 230 has, at one end thereof, an extension portion 231 that is bent and receives the light from the light emitter 220. The light emitted from the light emitter 220 enters the light guide 230 through the extension portion 231 of the light guide 230. An engagement protrusion 232 is formed in the extension portion 231. As shown in FIG. 5, the engagement protrusion 232 may be positioned next to or be in contact with a blocking protrusion 126 formed at the rear portion of the front housing 122. The engagement protrusion 232 and the blocking protrusion may prevent the light of the light emitter 220 from leaking outwards.

As the occupant manipulates the knob 140 such that the occupant rotates the knob 140 in one lateral direction or in the opposite lateral direction, the damper 130 is operated. The occupant may adjust the open/close degree of the duct 110 by the knob 140. Further, as the occupant manipulates the knob 140 such that the occupant rotates the knob 140 in one lateral direction or in the opposite lateral direction, the resistance of the variable resistor 210 is varied according to the manipulation amount of the knob 140, and the brightness or color of the light of the light emitter 220 is varied by the variable resistance varied by the variable resistor 210.

Referring to FIGS. 2 to 4, a knob housing 170 is coupled to a lower portion of the rear housing 121 of the air vent housing 120. A central shaft 141 of the knob 140 is rotatably fitted into shaft holes 171 of the knob housing 170, such that the knob 140 is rotatably installed in the knob housing 170. A resistor housing 250 is mounted at a lower portion of the knob housing 170. The resistor housing 250 is coupled to the knob housing 170 while accommodating the variable resistor 210. Further, a light emitter housing 260 is mounted to the front housing 122. The light emitter housing 260 is coupled to a rear portion of the front housing 122 while accommodating the light emitter 220. Accordingly, the variable resistor 210 and the light emitter 220 can be easily installed in the air vent housing so as to interlock with the rotation of the knob 140.

The variable resistor 210 has a rotatable input shaft 211. The input shaft 211 of the variable resistor 210 is coupled to the central shaft 141 of the knob 140. The variable resistor 210 has an output portion 212 that is connected to the light emitter 220. The rotation of the knob 140 rotates the input shaft 211. The input shaft 211 is rotated according to the rotation direction and the rotation amount of the knob 140. The variable resistor 210 varies the resistance according to the rotation of the knob 140 received through the input shaft 211, and transmits the varied resistance to the light emitter 220 through the output portion 212. Thus, according to the variable resistance of the variable resistor 210, the light emitter 220 may emit light such that the brightness or color of the light is varied.

The occupant in an automobile can manipulate the knob 140 such that cold air or warm air generated by the air conditioner is supplied to the automobile interior. In accordance with the manipulation amount of the knob 140, the variable resistor 210 varies the resistance, and the light emitter 220 emits light such that the brightness or color of the light is varied. The light emitted from the light emitter 220 enters the light guide 230 and is guided by the light guide 230. The light guided by light guide 230 is widely diffused through the diffusion plate 240. The light diffused through the diffusion plate 240 can be irradiated outwards through the irradiation hole 125 of the air vent housing with a constant intensity of illumination. In this regard, the brightness or color of the light of the light emitter 220, which is irradiated through the irradiation hole 125, may be determined by the rotation direction and the rotation amount of the knob 140.

As described above, in accordance with the manipulation amount of the knob, the brightness or the color of the light of the light emitter may be varied, and the brightness or the color of the light irradiated outside of the air vent housing may be varied accordingly. Accordingly, in circumstances where the automobile interior is dark, the occupant in the automobile can visually discern the wind amount supplied to the automobile interior through the air vent or the change in the wind amount due to the varied brightness or varied color of the light of the light emitter.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A lighting device for an automobile air vent, wherein the automobile air vent comprises a duct, an air vent housing coupled to the duct, a damper installed within the duct and configured to adjust an open/close degree of the duct, and a knob configured to adjust an operating amount of the damper, the lighting device comprising:
   a variable resistor connected to the knob and configured to vary a resistance according to a manipulation amount of the knob;
   a light emitter connected to the variable resistor and configured to emit light such that brightness or color of the light is varied according to the variable resistance varied by the variable resistor;
   a light guide configured to guide the light emitted by the light emitter; and
   a diffusion plate installed in the air vent housing and configured to diffuse the light guided through the light guide, wherein a substantial length of the light guide follows along a length of the diffusion plate.

2. The lighting device of claim 1, wherein an input shaft of the variable resistor is connected to a central shaft of the knob and an output portion of the variable resistor is connected to the light emitter.

3. The lighting device of claim 1, wherein an irradiation hole which allows the light diffused through the diffusion plate to be irradiated outwards is perforated through the air vent housing and the diffusion plate is coupled to the irradiation hole.

4. The lighting device of claim 3, wherein the irradiation hole is L-like in shape.

5. The lighting device of claim 3, wherein the automobile air vent further comprises a vane member configured to adjust a wind direction, wherein the air vent housing has a first opening through which a portion of the knob protrudes, and a second opening through which the vane member is exposed, and wherein the irradiation hole is formed along the second opening.

\* \* \* \* \*